United States Patent Office 2,989,518
Patented June 20, 1961

2,989,518
CARBOXYMETHYL BENZYL DEXTRAN
Leo J. Novak, Dayton, Ohio, assignor to The Commonwealth Engineering Company of Ohio, Dayton, Ohio
No Drawing. Filed May 13, 1957, Ser. No. 658,897
5 Claims. (Cl. 260—209)

This invention relates to glue, adhesives and the like and to their method of preparation, the invention being particularly concerned with the making of new carboxymethyl benzyl derivatives of polysaccharides and adhesive products therefrom.

An object of the invention is to provide a method for the preparation of new and improved carboxymethyl benzyl derivatives of carbohydrates which are useful adhesives for making waterproof paper laminates and the like.

A further object of the invention is to provide a process for the preparation of etherical derivatives of dextran or polysaccharidal substances particularly useful as adhesives, glues, cements, pastes, as hereinafter described.

These and other objects and advantages of the invention will become apparent to those skilled in the art in view of the following description.

The dextrans are high molecular weight, polysaccharides comprising anhydroglucopyranosidic units joined by molecular structural repeating alpha-non-1,6 and alpha-1,6 linkages, at least 50% of the linkages being, apparently, alpha-1,6 linkages.

Classically, the dextrans are biosynthesized from sucrose or a similar substrate by the action of the enzyme, dextransucrase, elaborated by specific microorganisms such as those of the *Leuconostoc mesenteroides* and *L. dextranicum* types.

In general, the native dextran produced by fermentation of an aqueous nutrient medium containing sucrose inoculated with a culture of the selected microorganism, or with the enzyme isolated from the culture, is characterized by an extremely high molecular weight. The molecular weight of the native dextran produced under conventional conditions is calculated to be in the millions. These native dextrans, however, vary in their structural or physical properties, including the ratio of 1,6 to non-1,6 linkages, the extent of branching, and the water sensitivity. These properties of the dextran are determined by the particular microorganisms used to elaborate the enzyme that effects the biosynthesis.

Although the linkages ratios vary, the native dextrans can be grouped in two main categories based on their water-sensitivity, (a) dextrans that are inherently readily soluble in water under normal conditions; (b) dextrans that are insoluble or difficultly soluble in water.

Native dextrans that are inherently readily soluble in water are obtained, for example, when a suitable aqueous nutrient medium containing sucrose or the like is inoculated with a culture of the microorganisms (or the enzyme dextransucrase filtered from the culture) bearing the following NRRL (Northern Regional Research Laboratory) designations; *Leuconostoc mesenteroides* B–512 (1,6 to non-1,6 ratio-19:1); B–119 (1,6 to non-1,6 ratio-15:1); B–1190 (1,6 to non-1,6 ratio-16:1); and B–1146 (1,6 to non-1,6 ratio-22:1).

On the other hand, if the nutrient medium is inoculated with a culture of a strain bearing one of the following designations—*Leuconostoc mesenteroides* B–1120, B–1118, B–523, B–1121, B–1143, B–1431, B–1149, B–1145–L and *Streptobacterium dextranicum* B–1254 (or with the enzyme separated from the culture), the native dextran obtained is inherently insoluble in water or only difficultly soluble therein under special conditions.

So-called "clinical dextran," i.e. dextran which complies with the specifications established by the U.S. Military authorities, and obtained in any suitable way, as by hydrolyzing the native material (usually *L. m.* B–512) to a molecular weight acceptable for intravenous injection (25,000 to 200,000 and preferably 60,000 to 90,000) may be used as starting material for making the carboxymethyl benzyl derivative of dextran in accordance with my invention.

The present invention provides carboxymethyl benzyl derivatives of these various water-soluble and water-insoluble native dextrans, as well as carboxymethyl benzyl compounds of dextrans of lower molecular weight, and such as obtained by hydrolysis of the native dextran and having molecular weights as low as 2,000. The carboxymethyl dextrans contain, per anhydroglucose unit, an average of from 1.0 to 3.0 carboxymethyl groups.

Introduction of the carboxymethyl groups into the dextran molecule modifies the dextran rendering it soluble in water if it is a water-insoluble dextran. This is brought about by increasing the polar groups in the molecule so that the reactivity of the dextrans with various chemical reagents is enhanced.

The carboxymethyl benzyl dextran is obtained by reacting dextran with an alkali metal salt of monochloracetic acid, and then reacting the resultant product with benzyl chloride to form the benzyl derivative. The equation for the reaction is illustrated as follows—

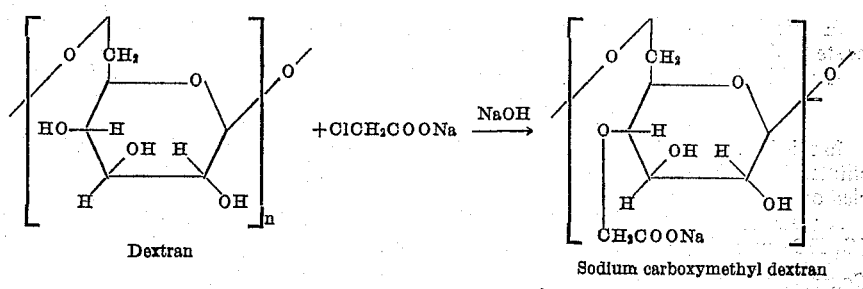

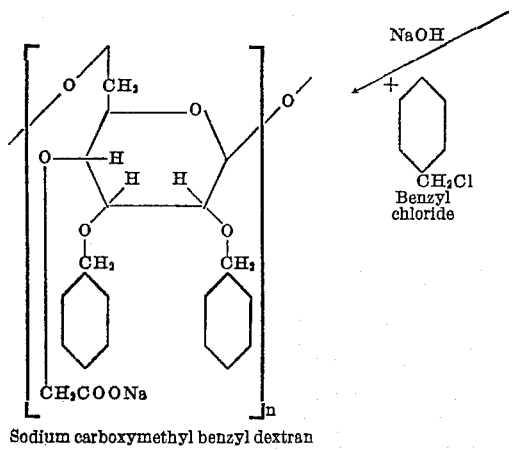

Sodium carboxymethyl benzyl dextran

Sodium carboxymethyl benzyl dextran (NaCMBD) as produced had a D.S. (degree of substitution or average number of carboxymethyl groups per anhydroglucopyranosidic unit) of 2, whereas sodium carboxymethyl dextran has a D.S. of 1.

Carboxymethyl benzyl dextran combines the hydrophilic carboxymethyl properties with the hydrophobic benzyl characteristics to provide a compound which can be readily dispersed or emulsified in water to form an adhesive product. The product has improved adhesive characteristics as compared with carboxymethyl benzyl starch.

The following examples are given as exemplary of how the product is produced, the parts being by weight unless otherwise stated.

EXAMPLE I

Carboxymethyl benzyl dextran is prepared from clinical dextran as follows—

Two hundred and forty-two (242) grams of sodium carboxymethyl dextran (1 mole) made from clinical B-512 dextran having a molecular weight of approximately 70,000 and a D.S. of 1, were dissolved in 500 mls. of water containing 100 grams of sodium hydroxide (2½ moles). To the resultant solution was added 253 grams of benzyl chloride (2 moles) and the reactants refluxed at 100° C. for five hours. Carboxymethyl benzyl dextran (CMBD) separates from the reaction mixture as a light yellow taffy mass. The CMBD was drawn off and washed twice with 2 to 500 mls. of cold (0° C.) water. To the washed CMBD was added two liters of warm (25° C.) water and shaken. The CMBD is dispersed forming a milky solution. Addition of hydrochloric acid (0.1 N) is made to the milky solution whereby the carboxymethyl benzyl dextran is precipitated which was filtered off and washed with cold water.

The washed reprecipitated CMBD was added to 2 liters of methanol. When heated and stirred it dissolved. To this was then added 200 cc. of saturated methanolic sodium hydroxide. This precipitated the CMBD from the alcohol, which was washed twice with 99% methanol and vacuum dried. It gave a light yellow powder. Yield —380 grams.

EXAMPLE II

In this instance the procedure of Example I was repeated using native dextran (B-512).

A yield of 350 grams of CMBD was obtained.

EXAMPLE III

In this instance carboxymethyl starch (CMBS) was substituted for carboxymethyl dextran and the procedure carried out as in Example I.

A yield of 400 grams of carboxymethyl benzyl starch (CMBS) was obtained.

*Comparative properties of CMBD's from clinical and native B-512 dextrans and CMBS from cornstarch*

These three compounds of dextran, namely CMBD as made from clinical dextran (Example I); CMBD made from native dextran (Example II); and CMBS as made from cornstarch (Example III) can all be dispersed in water which has been made alkaline, preferably with ammonia instead of caustic. The CMBD's of lower molecular weight made from dextrans in the clinical range or higher, to an estimated 300,000 or lower, down to 1,000, form clear solutions at 5%.

The analogous material from the native dextran dissolves in alkaline solutions and forms a clear solution with a slightly higher viscosity at 5%.

The CMBS disperses in alkaline solutions at approximately the same rate as the lower molecular weight range CMBD's. However, it does not form a clear or translucent solution at 10% but constitutes more of a colloidal dispersion resembling milk and constitutes a system of discrete colloidal particles sufficiently hydrated to give a stable colloidal system with viscosity characteristics (at 5%) greater than the viscosity of analogous native CMBD (5%, pH 11.0, relative viscosity approximately 6.0). All three materials are thermoplastic, however, the low molecular weight CMBD is the most thermoplastic, followed by the CMBD native. The CMBS is only slightly thermoplastic (at 70° C.).

All three benzyl dextran derivatives are precipitated quantitatively below pH 7.0 from water by the addition of acid. The solubility properties of these three materials are indicated in the following table:

TABLE OF SOLUBILITIES

| Compound | Acetone | Ethyl Acetate | Toluene | Formamide | Methanol | Alkaline Methanol |
|---|---|---|---|---|---|---|
| CMBD 512 M.W. Clinical | S.S. | Ins. | Ins. | S. | S. | Ins. |
| CMBD 512 Native | S.S. | Ins. | Ins. | S. | S. | Ins. |
| CMBS Cornstarch | S.S. | Ins. | Ins. | S. | Ins. | Ins. |

S.S.—Slightly soluble.
Ins.—Insoluble.
S.—Soluble.

*Water based products containing carboxymethyl benzyl polysaccharides (such as dextran) for use as waterproof adhesives*

Research and development work conducted on adhesives has shown that there is a general problem in making waterproof adhesive products for paper to paper bonding or laminating which is waterproof. Materials such as polyvinyl acetate, or resin (polystyrene, polyester, etc.) are soluble in organic solvents (toluene, ketones, alcohols, etc.) but insoluble in water. When solutions for example, of polyvinyl acetate in toluene or methanol are spread between two pieces of kraft paper for bonding, and this is air dried at air or low temperatures (below the softening or fusing point of the resin), no bonding or laminating of the paper occurs, because there is no affinity, swelling, or adhesion developed between the cellulosic fibers and the solid polyvinyl acetate particles.

To effect the cellulosic fibers, e.g., swell them or cause strong cellulosic fiber adsorptive forces to come into play for bonding same, water is the agent par excellence. Most resins, however, which would give waterproofing are water insoluble and do not give waterproof or water resistant paper adhesive laminates, unless heat-treated to fluxing or fusion temperature.

In accordance with this invention, after considerable experimentation and tests, it has been found unexpectedly that aqueous solutions of carboxymethyl benzyl dextran function as excellent adhesives which are waterproof when applied between papers and dried. The waterproof adhesive properties are developed and an adherent bond produced when applied and dried at ordinary room or even lower temperatures.

The following are illustrative of solutions of carboxymethyl benzyl dextran which have been found useful for adhesive purposes, the parts being by weight unless otherwise stated:

EXAMPLE IV

Ten grams of CMBD 512 (clinical) were dissolved in 100 cc. $H_2O$, containing 2 cc. of ammonium hydroxide. This was boiled to remove excess ammonia. It had a relative viscosity of about 6.0 at room temperature (25° C.) and a pH of 10.0.

This was spread (0.01″ film thickness) and a piece of kraft paper placed thereon. The laminate was dried for two hours at room temperature, then soaked for 24 hours in water. When the wet paper plies were torn apart it was observed that the cellulose fibers of the paper were torn and a water resistant paper to paper bond had been formed.

EXAMPLE V

Example IV was repeated except dilute acetic acid was added, with good stirring, to the solution until a pH of 7.0 was attained. The solution remained clear. This was used to laminate kraft paper as described. It produced an improved bond which was strong and water resistant.

EXAMPLE VI

Ten grams of CMBD (512) clinical were dissolved in 95 ccs. of water plus 5 ccs. of $NH_4OH$, and boiled to remove excess ammonia to a volume of 60 cc.

Twenty grams of polyvinyl acetate (Du Pont's Elvacet 40–15) were dissolved in 60 cc. of toluene to which 20 gms. of powdered (200 mesh) china clay were added.

The resultant polyvinyl acetate-clay toluene dispersion was added to the CMBD-water $NH_4OH$ solution in a mixer where it emulsified to form a stable emulsion of toluene-PVA clay dispersed discontinuous phase in CMBD-ammonia-water as a continuous phase. When spread between paper and air dried (72° F.) for 2 hours, this gave a very good waterproof paper to paper bond.

*Comparisons between CMBD-512 clinical, CMBD-native 512, and CMB-cornstarch*

Solutions of these three materials were prepared as described in Examples I, II and III above, and spread on glass plates and between paper laminates. The glass plates were exposed to running water for three hours, and the paper laminates soaked in water for 24 hours, then pulled apart.

The test results showed that the CMBD-clinical 512 was the most water resistant, the CMBD native 512 next, and the CMB-cornstarch the poorest, both as to (1) Water-resistance of film at room temperature, and
(2) Waterproofness of bonded paper sheets.

The waterproof adhesive properties exhibited by CMBD compositions is not readily explained. It has been observed, however, that CMBD and CMBS in alkaline water solution are extremely sensitive to acid pH and are precipitated quantitatively. The following table shows the pH values versus soluble properties of these compounds—

|  | Clear | Turbid | Precipitates |
|---|---|---|---|
| CMBD 512 Dextran Clinical | 8.0 | 6.5 | 5.0 |
| CMBD native | 8.0 | 7.0 | 5.0 |
| CMBS Cornstarch | 8.5 | 6.5 | 4.5 |

Cellulose is a slightly acidic material and when a solution or emulsion containing CMBD or CMBS plus volatile base (ammonia) is placed on cellulosic paper, the solubility of these mixed ethers decrease and give waterproof bond, as the ammonia evaporates. When an emulsion of discontinuous phase polyvinyl acetate with or without acid clay filler in a continuous phase of CMBD or CMBS in water plus volatile base ($NH_4OH$) there is an additive effect due to (a) The acidic cellulose
(b) The acidic polyvinyl acetate, and
(c) The acid clay when the film dries and the toluene and ammonia is eliminated, exposing the CMBD or CMBS to same.

Further, CMBD's and CMBS's have a soap-like or detergent action in the presence of alkali or ammonia and solutions having a pH 7.0. They dissolve faster in $NH_4OH$ plus $H_2O$ as compared to alkali (NaOH) plus water. This alkaline detergent action, it is thought, aids in effecting the cellulose fibers favorably to bonding with such adhesive.

The carboxymethyl benzyl polysaccharide adhesive compositions prepared in accordance with this invention have widespread application, and may be used wherever a bonding agent is desired.

What is claimed is:
1. As a new composition for use as an adhesive and comprising as an essential constituent carboxymethyl benzyl dextran dissolved in a solvent.
2. As a new composition for use as an adhesive and comprising as an essential constituent sodium carboxymethyl benzyl dextran dissolved in a solvent.
3. As a new composition for use as an adhesive and comprising as an essential constituent carboxymethyl benzyl derivatives of a water-soluble dextran containing per anhydroglucose unit an average of from 1.0 to 3.0 carboxymethyl groups dissolved in a solvent.
4. As a new composition for use as an adhesive and comprising as an essential constituent carboxymethyl benzyl dextran derived from clinical B–512 dextran dissolved in a solvent.
5. As a new composition for use as an adhesive and comprising as an essential constituent carboxymethyl benzyl dextran derived from native B–512 dextran dissolved in a solvent.

References Cited in the file of this patent
UNITED STATES PATENTS

| | | |
|---|---|---|
| 2,203,705 | Stahley et al. | June 11, 1940 |
| 2,380,879 | Stahley et al. | July 31, 1945 |
| 2,476,331 | Swinehart et al. | July 19, 1949 |
| 2,671,779 | Gaver et al. | Mar. 9, 1954 |
| 2,734,828 | Toulmin | Feb. 14, 1956 |
| 2,768,096 | Toulmin | Oct. 23, 1956 |
| 2,789,915 | Bishop | Apr. 23, 1957 |
| 2,811,516 | Novak | Oct. 29, 1957 |